(12) United States Patent
Matthews et al.

(10) Patent No.: US 9,703,893 B2
(45) Date of Patent: *Jul. 11, 2017

(54) SEARCH TOOL USING MULTIPLE DIFFERENT SEARCH ENGINE TYPES ACROSS DIFFERENT DATA SETS

(71) Applicant: Microsoft Technology Licensing, LLC, Redmond, WA (US)

(72) Inventors: David A. Matthews, Seattle, WA (US); Matthew R. Lerner, Seattle, WA (US); David G. De Vorchik, Seattle, WA (US); Stuart Sechrest, Redmond, WA (US); Song Zou, Issaquah, WA (US); Bret P. Anderson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

This patent is subject to a terminal disclaimer.

(21) Appl. No.: 14/797,893

(22) Filed: Jul. 13, 2015

(65) Prior Publication Data
US 2015/0317397 A1    Nov. 5, 2015

Related U.S. Application Data

(62) Division of application No. 11/462,280, filed on Aug. 3, 2006, now Pat. No. 9,323,867.

(51) Int. Cl.
*G06F 7/00*   (2006.01)
*G06F 17/00*   (2006.01)
(Continued)

(52) U.S. Cl.
CPC ...... *G06F 17/30979* (2013.01); *G06F 3/0482* (2013.01); *G06F 3/04842* (2013.01); *G06F 17/30864* (2013.01)

(58) Field of Classification Search
CPC ......... G06F 17/30979; G06F 17/30657; G06F 17/30554
See application file for complete search history.

(56) References Cited

U.S. PATENT DOCUMENTS 6,018,733 A    1/2000   Kirsch et al.
6,029,165 A    2/2000   Gable
(Continued)

OTHER PUBLICATIONS

Beigi, et al., "MetaSEEk: A Content-Based Meta-Search Engine for Images" Available at http://www.ctr.columbia.edu/papers_advent/98/SPIEjan98_ana.pdf, In SPIE Conference on Storage and Retrieval for Image and Video Databases VI, vol. 3312, San Jose, CA, Jan. 1998, 11 pgs.

(Continued)

*Primary Examiner* — Susan Chen
(74) *Attorney, Agent, or Firm* — Lee & Hayes, PLLC (57) ABSTRACT

Various embodiments provide for use of multiple different search engines. The individual search engines are configured to conduct searches in different ways across a search space that includes different types of data sets. In at least some embodiments, the type of search engine that is utilized is selected to due characteristics of the data set(s) that is (are) to be searched. In search spaces that include different types of data sets, combining and mixing different search engines to collectively search the search space can provide a desirably fast and robust user experience.

20 Claims, 8 Drawing Sheets

(51) Int. Cl.
*G06F 17/30* (2006.01)
*G06F 3/0482* (2013.01)
*G06F 3/0484* (2013.01)

(56) References Cited

U.S. PATENT DOCUMENTS

| | | | |
|---|---|---|---|
| 6,094,649 | A | 7/2000 | Bowen et al. |
| 6,102,969 | A | 8/2000 | Christianson et al. |
| 6,134,541 | A | 10/2000 | Castelli et al. |
| 6,134,546 | A | 10/2000 | Bestgen et al. |
| 6,185,569 | B1 | 2/2001 | East et al. |
| 6,292,802 | B1 | 9/2001 | Kessenich et al. |
| 6,320,849 | B1 | 11/2001 | Hughes et al. |
| 6,349,307 | B1 | 2/2002 | Chen |
| 6,711,568 | B1 | 3/2004 | Bharat et al. |
| 6,947,924 | B2 | 9/2005 | Bates et al. |
| 6,968,366 | B1 | 11/2005 | Zhang et al. |
| 7,107,536 | B1 | 9/2006 | Dowling |
| 7,162,465 | B2 | 1/2007 | Jenssen et al. |
| 7,188,100 | B2 | 3/2007 | De Bellis et al. |
| 7,340,686 | B2 | 3/2008 | Matthews et al. |
| 7,340,688 | B2 | 3/2008 | Sanderson et al. |
| 7,546,602 | B2 | 6/2009 | Hejlsberg et al. |
| 9,323,867 | B2 * | 4/2016 | Matthews ......... G06F 17/30979 |
| 2003/0126235 | A1 | 7/2003 | Chandrasekar et al. |
| 2003/0140120 | A1 | 7/2003 | Hartman |
| 2003/0212737 | A1 | 11/2003 | Moricz et al. |
| 2005/0004943 | A1 | 1/2005 | Chang |
| 2005/0086254 | A1 | 4/2005 | Zou et al. |
| 2005/0108189 | A1 | 5/2005 | Samsonov |
| 2005/0240756 | A1 | 10/2005 | Mayer |
| 2006/0010230 | A1 * | 1/2006 | Karklins ............... G05B 19/05 709/223 |
| 2006/0117002 | A1 | 6/2006 | Swen |
| 2006/0129541 | A1 * | 6/2006 | Morgan ........... G06F 17/30637 |
| 2006/0253438 | A1 | 11/2006 | Ren et al. |
| 2006/0253794 | A1 | 11/2006 | Wilson |
| 2007/0043704 | A1 | 2/2007 | Raub et al. |
| 2007/0244900 | A1 | 10/2007 | Hopkins et al. |

OTHER PUBLICATIONS

Lawrence, et al., "Inquirus, the NECI meta search engine" Available at http://cybermetrics.cindoc.csic.es/cybermetrics/pdf/92.pdf, Proc 7th Intl Conf on World Wide Web, Apr. 1998, pp. 95-105.

Lee et al., "Global Atlas: Calibrating and Indexing Documents from the Internet in the Cartographic Paradigm", Proc First Intl Conf on Web Information Systems Engineering, Jun. 2000, vol. 1, pp. 125-132.

Office action for U.S. Appl. No. 11/462,280, mailed on May 13, 2015, Matthews et al., "Search Tool Using Multiple Different Search Engine Types Across Different Data Sets", 21 pages.

Office Action for U.S. Appl. No. 11/462,280, mailed on Jul. 17, 2014, David A. Matthews, "Search Tool Using Multiple Different Search Engine Types Across Different Data Sets", 16 pages.

* cited by examiner

SEARCH TOOL USING MULTIPLE DIFFERENT SEARCH ENGINE TYPES ACROSS DIFFERENT DATA SETS

CROSS REFERENCE TO RELATED APPLICATIONS

This is a divisional application which claims priority to commonly assigned, co-pending U.S. patent application Ser. No. 11/462,280, filed Aug. 3, 2006, entitled "Search Tool Using Multiple Different Search Engine Types Across Different Data Sets". Application Ser. No. 11/462,280 is fully incorporated herein by reference.

BACKGROUND

Typically, a computer user has access to different types of data that can have different characteristics. For example, some data might make up a relatively small data set. Yet other data might make up a relatively large data set. Collectively, these different types of data provide a vast collection of information that is available for a user to use. Many times, in order to find particular data, a user will conduct a search using a particular search engine that might reside on their computing device.

Searching across different data sets can be challenging insofar as providing a desirable user experience. Specifically, a search that might be appropriate for one type of data set may not necessarily be appropriate or desirable for another type of data set.

SUMMARY

Various embodiments provide for use of multiple different search engines. The individual search engines are configured to conduct searches in different ways across a search space that includes different types of data sets. In at least some embodiments, the type of search engine that is utilized is selected due to characteristics of the data set(s) that is (are) to be searched. In search spaces that include different types of data sets, combining and mixing different search engines to collectively search the search space can provide a desirably fast and robust user experience. In the same or different embodiments, the type of search engine that is utilized is a function of a number of letters in a query string.

DETAILED DESCRIPTION

Overview

Various embodiments provide a search tool that utilizes multiple different search engines. The individual search engines are configured to conduct searches in different ways across a search space that includes different types of data sets. In at least some embodiments, the type of search engine that is utilized is a function of characteristics of the data set(s) that is (are) to be searched. In search spaces that include different types of data sets, combining and mixing different search engines to collectively search the search space can provide a desirably fast and robust user experience.

The search tool about to be described can be utilized in accordance with any suitable type of computing device and can be used in any suitable searching scenario in which is it desirable to allow a user to search across a search space. The search space can include, by way of example and not limitation, all or several parts of the user's own computing device, one or more other computing devices, one or more servers or other networked data repositories and the like.

Figure 1:
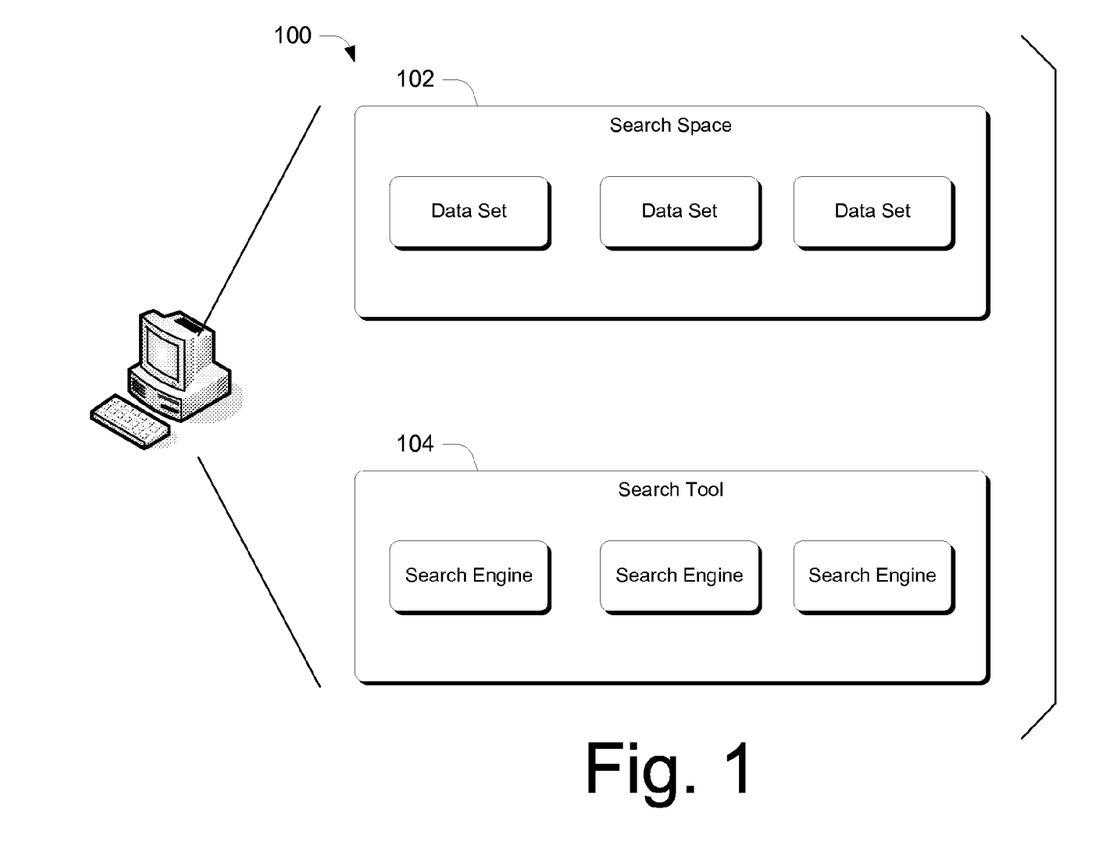
FIG. 1 illustrates an exemplary system in accordance with one embodiment.

FIG. 1 illustrates an exemplary system generally at 100 in accordance with one embodiment. Here, system 100 includes a search space 102 and search tool 104. Search space 100 includes multiple different types of data sets and search tool 104 includes multiple different types of search engines.

The various data sets that make up the search space can have varying characteristics or properties. For example, one property of a data set can be its size. Specifically, some data sets in the search space may be relatively small, while other data sets may be relatively large. Another property of a data set can be the size that it is expected to grow to over time. For example, some data sets will be unlikely, in expected usage, to grow past some small size, while others are likely, in expected usage, to grow to a very large size.

As noted above, the search tool 104 includes multiple different types of search engines. These search engines are typically embodied in the form of computer-readable instructions or software that resides on some type of computer-readable medium. A computer-readable medium may be a tangible computer-readable storage medium including, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. In practice and as described below in more detail, the principles of operation of the individual search engines are different. For example, a first of the search engines can be configured to conduct its searching in a manner that is different from the manner in which a second of the search engines is configured to search. For example, one search engine can be configured to conduct linear searches, while another search engine can be configured to conduct index searches. Linear searches and index searches are generally well known by the skilled artisan. A linear search involves, as the name implies, linearly or serially searching a collection of items in a data set. An index search involves searching an index which indexes content that may reside, for example, on a user's computer. Indexes can vary in terms of how they are set up and maintained. Typically, however, an index contains an index entry, such as a keyword, and then a number of properties associated with that keyword. For example, an index may contain the word "note" as a keyword, and then include a property of the files in which that word appears.

When using the search tool 104 to search the search space 102, by appreciating the various different characteristics and properties as between the different data sets, individual search engines can be selected to conduct searches that are appropriate for the data set that is being searched. Hence, when searching across a search space that includes different types of data sets, a combination of search engines can be selected and selectively employed with an appropriate data set to collectively provide a very fast search and, in turn, enhance the user's searching experience. For example, on data sets that are relatively small, a search engine that conducts a linear search can be used. Similarly, on data sets that are relatively large, a search engine that conducts an index search can be used.

Figure 2:
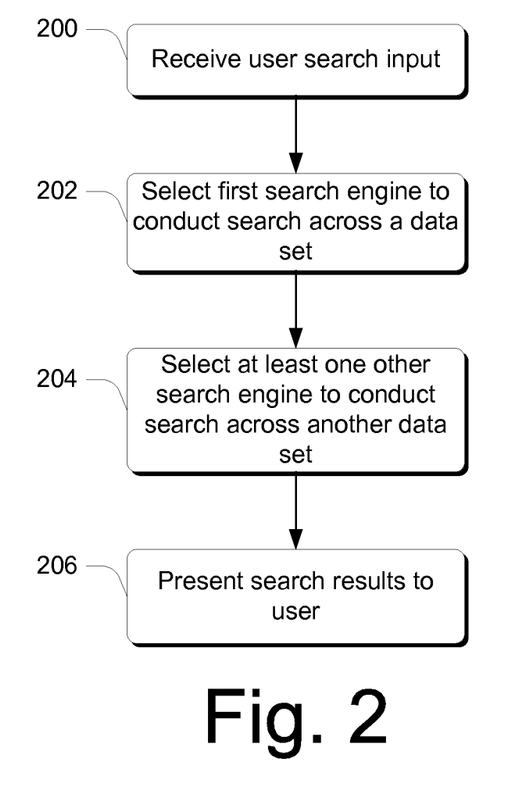
FIG. 2 is a flow diagram that describes steps in a method in accordance with one embodiment.

FIG. 2 is a flow diagram that describes steps in a method in accordance with one embodiment. The method can be implemented in connection with any suitable hardware, software, firmware or combination thereof. In at least one embodiment, the method can be implemented by a suitably configured search tool.

Step 200 receives user search input. This step can be performed in any suitable way. For example, a user interface component can be presented to the user and the user can type in a particular search term that is of interest. Step 202 selects a first search engine to conduct a search across a data set that is part of a relevant search space. Step 204 selects at least one other search engine to conduct a search across another data set. It is to be appreciated and understood that steps 202 and 204 can be performed simultaneously. Specifically, different search engines can be called at the same time to perform their respective searches. Step 206 presents the search results to the user.

By selecting different search engines depending on the characteristics of the data sets being searched, efficient searches across diverse data sets can be conducted and search results can be very quickly returned to the user.

In the example described just below, a search scenario in the form of a desk top search conducted from a start menu is described. It is to be appreciated and understood that this scenario is described, among other reasons, to give the reader an appreciation of one particular specific context in which the inventive search tool can be used. As such, other search scenarios can be utilized without departing from the spirit and scope of the claimed subject matter.

Implementation Example

Preliminarily, before describing the exemplary start menu implementation, consider the following.

A start menu is typically used by a computer user when they are either initiating their computing activities and/or performing a limited number of typically well understood actions, such as looking for a program to launch, looking for documents, pictures or music, accessing a control panel and the like. That is, there is a common expectation that a start menu will be used for certain definable actions and activities.

In accordance with one embodiment, a search box is provided as part of the start menu user interface and enables the user to quickly search for items on their computer. A good assumption about a user who uses a start menu search box is that they are more likely to search for some types of data (data sets) than others. For example, one of the primary uses of the start menu is to launch programs. Hence, if a user decides to use the start menu's search box, a good assumption is that they might be looking for a particular program. It is, of course, possible that they are looking for something else—but generally, the assumption that the user might be looking for a program is a good one.

Thus, when one looks at the possible uses of a start menu and juxtaposes the types of data that a user might search using a start menu search box, groups of data sets begin to emerge. As an example of one collection of data set groups, consider the following.

A first data set or group that a user might be interested in can be considered as "programs". Programs can include the programs that are loaded on the user's computing device, application in their path, and control panels. One characteristic of the programs data set is that it is relatively small and does not grow very large with normal usage.

A second data set or group that a user might be interested in can be considered as "web-related items". Web related items can include web pages from the user's favorites folder and/or web pages from the user's internet browsing history. One characteristic of the web-related items data set is that it is relatively small and does not grow very large with normal usage A third data set or group that a user might be interested in can be considered as "files". Files can include any files that the user has on their device such as document files, music files and the like. One characteristic of the files data set is that it tends to be relatively larger and tends to grow to a larger size than those data sets mentioned above.

A fourth data set or group that a user might be interested in can be considered as "communications". Communications can include email messages, instant messaging messages, appointments, contacts and the like. One characteristic of the communications data set is that it is relatively larger and can tend to grow to a larger size than the first two data sets mentioned above.

In accordance with one embodiment, when a user accesses the start menu's search box and begins typing in letters, search results that match their query appear in the start menu. To enhance the user experience, this can be done on a letter by letter basis. Accordingly, as the user types in the first letter, they can see a set of search results that match the first letter. As they type in the second letter, the search results can change, and so on.

In practice and in view of the different types of data sets that make up the searchable search space, different search engines are selected to search individual data sets. For example, in the implementation example just above, for the first two groups, i.e. programs and web-related items, because of the relative size of such data sets, a search engine that conducts a linear search can be used, as will be appreciated by the skilled artisan. However, for the last two groups, i.e. files and communications, because of the relative size of such data sets, a different search engine and one that conducts an index search can be used.

It should be appreciated and understood that for queries that will return many results, items from the smaller data sets can be returned faster if they are linearly searched separately, rather than if they are included in the index of the larger data set and only one search is performed. In addition, the complexity and overhead of an index can be avoided if the search is known to cover only a small data set.

Figure 3:
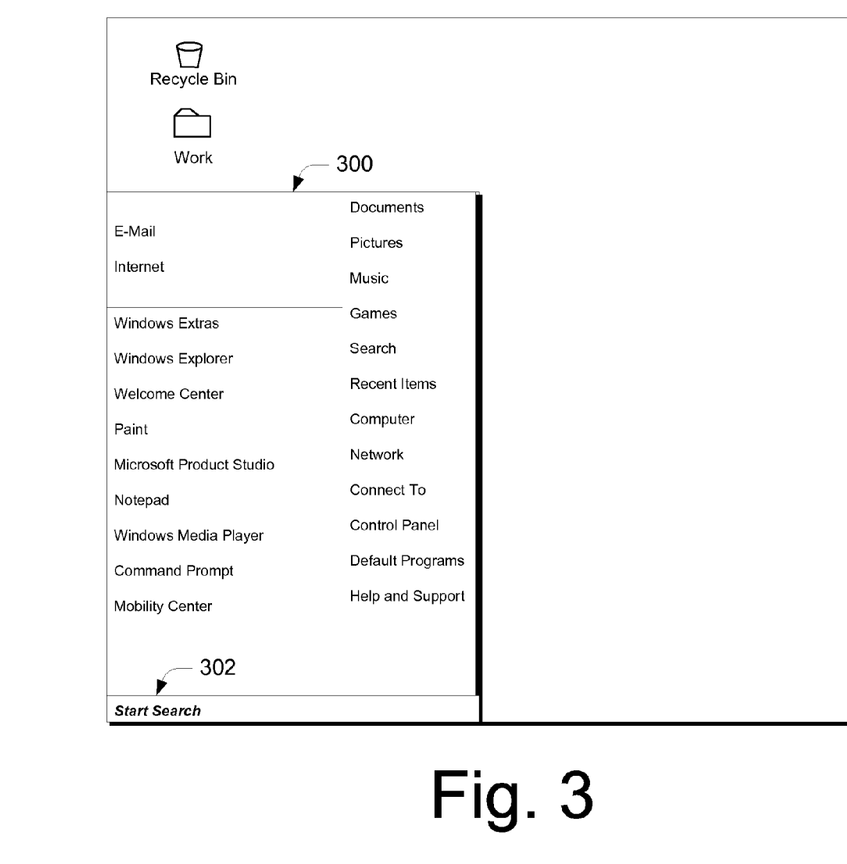
FIG. 3 is an exemplary user interface in accordance with one embodiment.

As an example of a user interface that can be used to enable a user to search in accordance with one embodiment, consider FIG. 3. There, a start menu 300 is shown with a display of programs and other items that can be selected by a user. In addition, a search box 302 is shown. Assume now that a user wishes to search their computing device using search box 302. Assume also that they are looking for something having to do with "mail".

Figure 4:
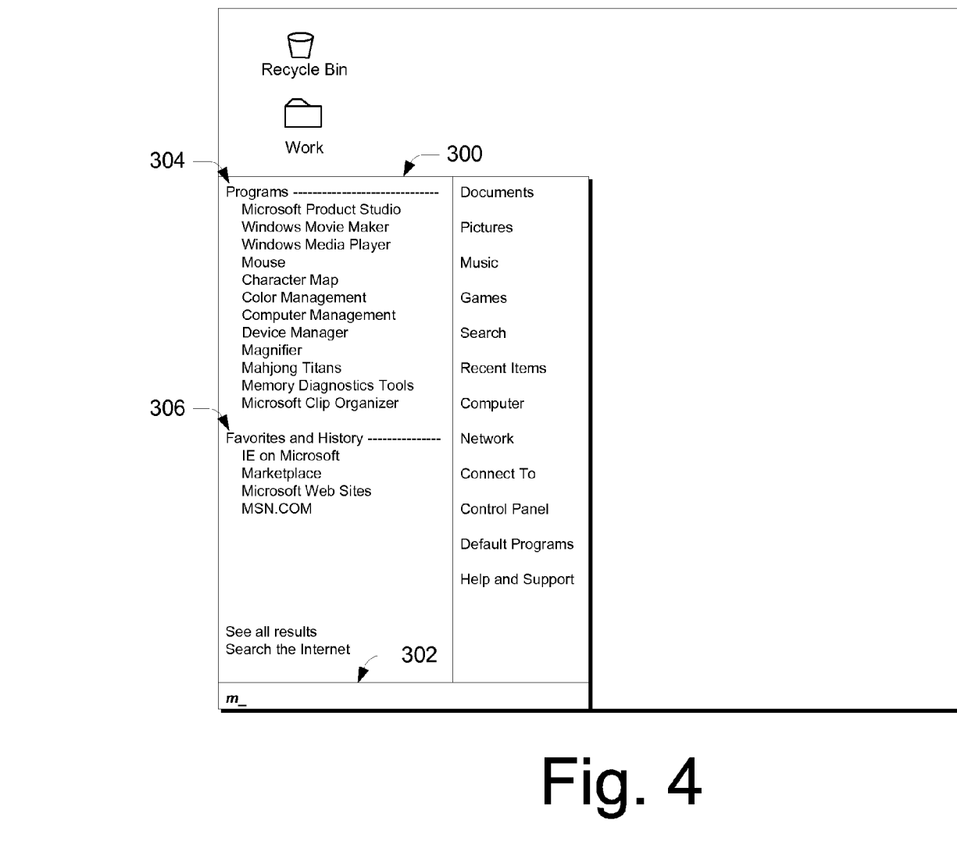
FIG. 4 is an exemplary user interface in accordance with one embodiment.

FIG. 4 shows search box 302 after the user has typed in the letter "m". Notice that the display in the start menu now changes. In this example, a programs portion 304 displays programs that include a word that starts with the letter "m". Similarly, a favorites and history portion 306 displays web related items that have a word that starts with the letter "m".

Figure 5:
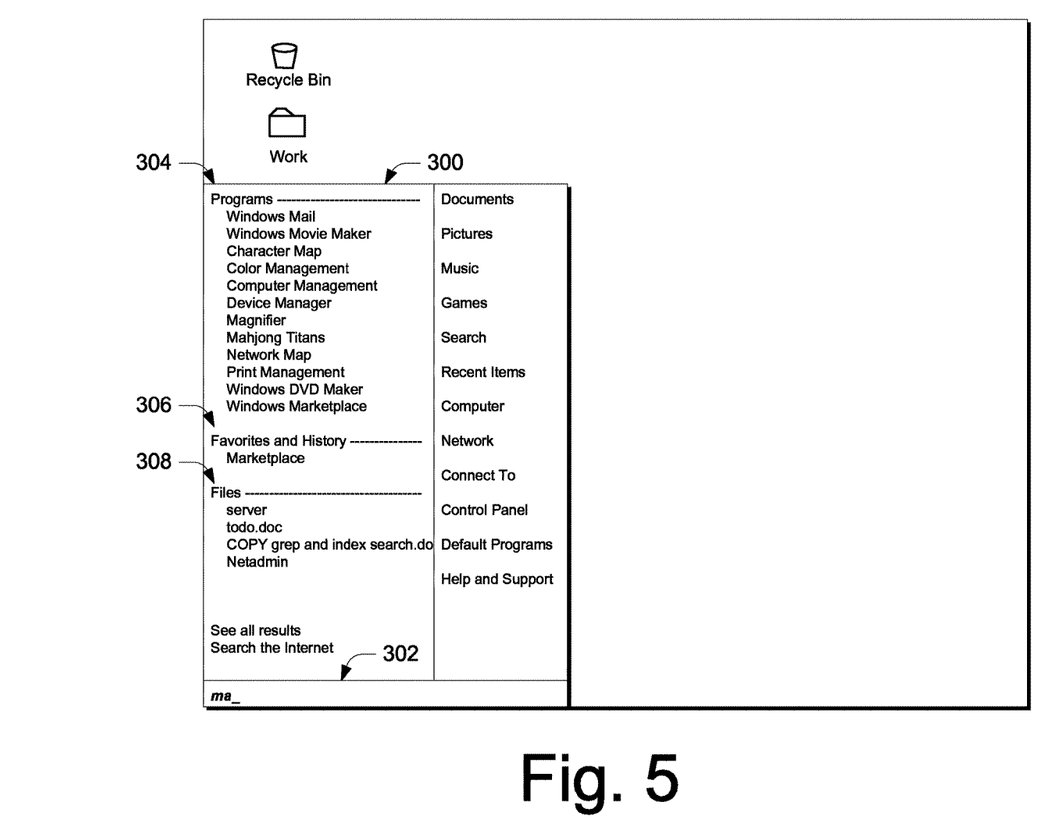
FIG. 5 is an exemplary user interface in accordance with one embodiment.

FIG. 5 shows search box 302 after the user has typed in the letters "ma". Notice that the display in the start menu now changes from that which is shown in FIG. 4. In this example, programs portion 304 displays programs that include a word that starts with the letters "ma". Similarly, a favorites and history portion 306 displays web related items that have a word that starts with the letters "ma". Additionally, a files portion 308 displays files that either have a word in their name that starts with "ma", or have a word in them that starts with "ma". In this particular example, the files portion was not shown when only one letter was typed in. The reason for this is that the result set of files that include a particular letter is potentially very large so as to present information to the user that is of questionable value. Accordingly, by waiting to display the file portions results until multiple letters have been typed in, certain efficiencies may be gained.

Figure 6:
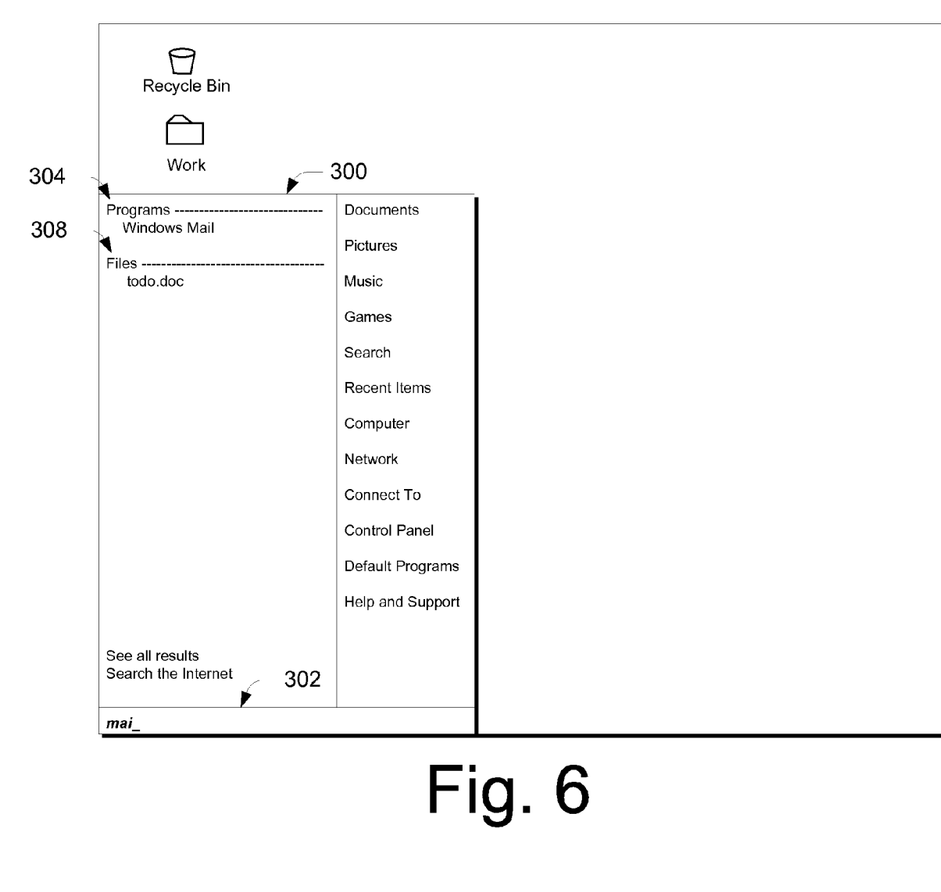
FIG. 6 is an exemplary user interface in accordance with one embodiment.

FIG. 6 shows search box 302 after the user has typed in the letters "mai". Notice that the display in the start menu now changes from that which is shown in FIG. 5. In this example, programs portion 304 displays a single program that include a word that starts with the letters "mai". Files portion 308 displays a file that contains a word that starts with "mai". Notice here that the favorites and history portion has been removed from the user interface because it contains no items that have a word that starts with "mai".

Figure 7:
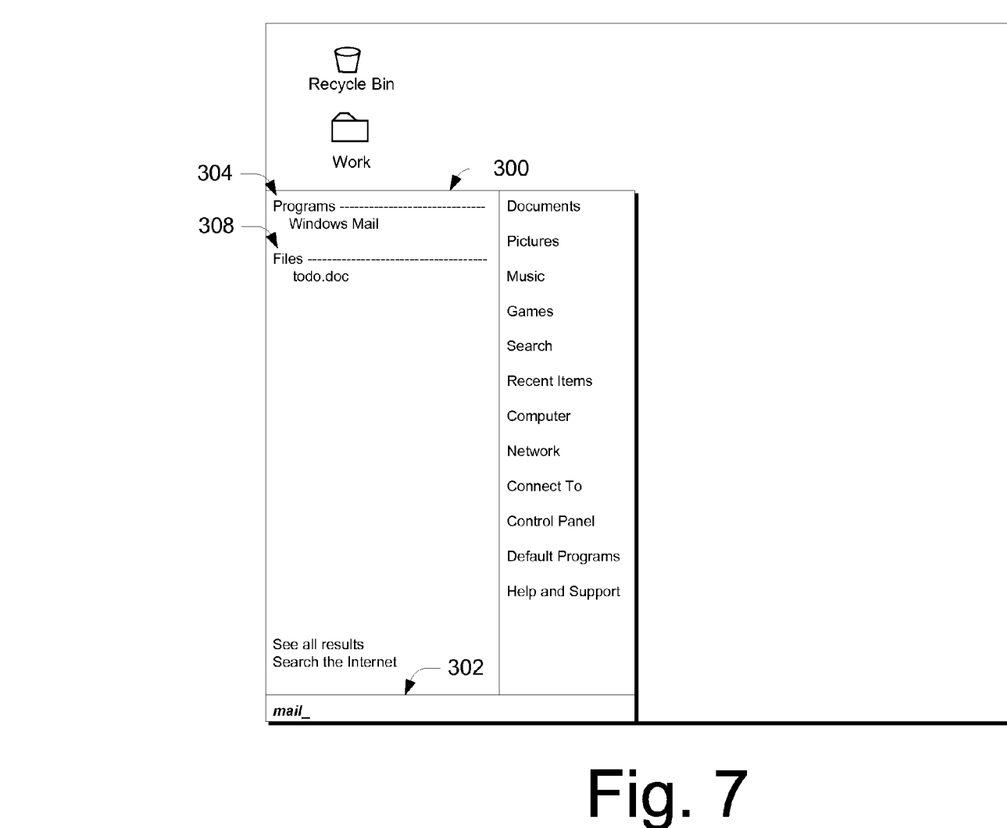
FIG. 7 is an exemplary user interface in accordance with one embodiment.

FIG. 7 shows search box 302 after the user has rounded out their search term by typing in the term "mail". Here, the display has not changed from that which is shown in FIG. 6.

By presenting search results in a letter-by-letter fashion, the user can instantly see their search results as they develop. In addition, by combining different types of search engines for different types of data sets, the collective search space can be quickly and efficiently searched.

Adapting the Search Engine Type Based on Data Set Characteristics

In at least some embodiments, the search engine type that is used to search a particular data set can be changed when the characteristics associated with that data set change in a manner which indicates that a different search engine would be more efficient. For example, as noted above, a linear search can be used for data sets that are relatively small. If, however, the data grows over time and assumes a size that lends itself more readily to an index search, then a different search engine can be selected for searching that particular data set. In this case, a size threshold can be set and if the data set exceeds the defined size threshold, then a different search engine can be used.

Changing Search Engines Based on the Length of the Query String

In at least some embodiments, the search engine that is used can be changed based on the length of the query string that is entered by the user. For example, the search tool might use a search engine to conduct a linear search of programs for query strings that are two letters or less, and then switch to a search engine that uses an index search for three letters or more.

Exemplary Method

Figure 8:
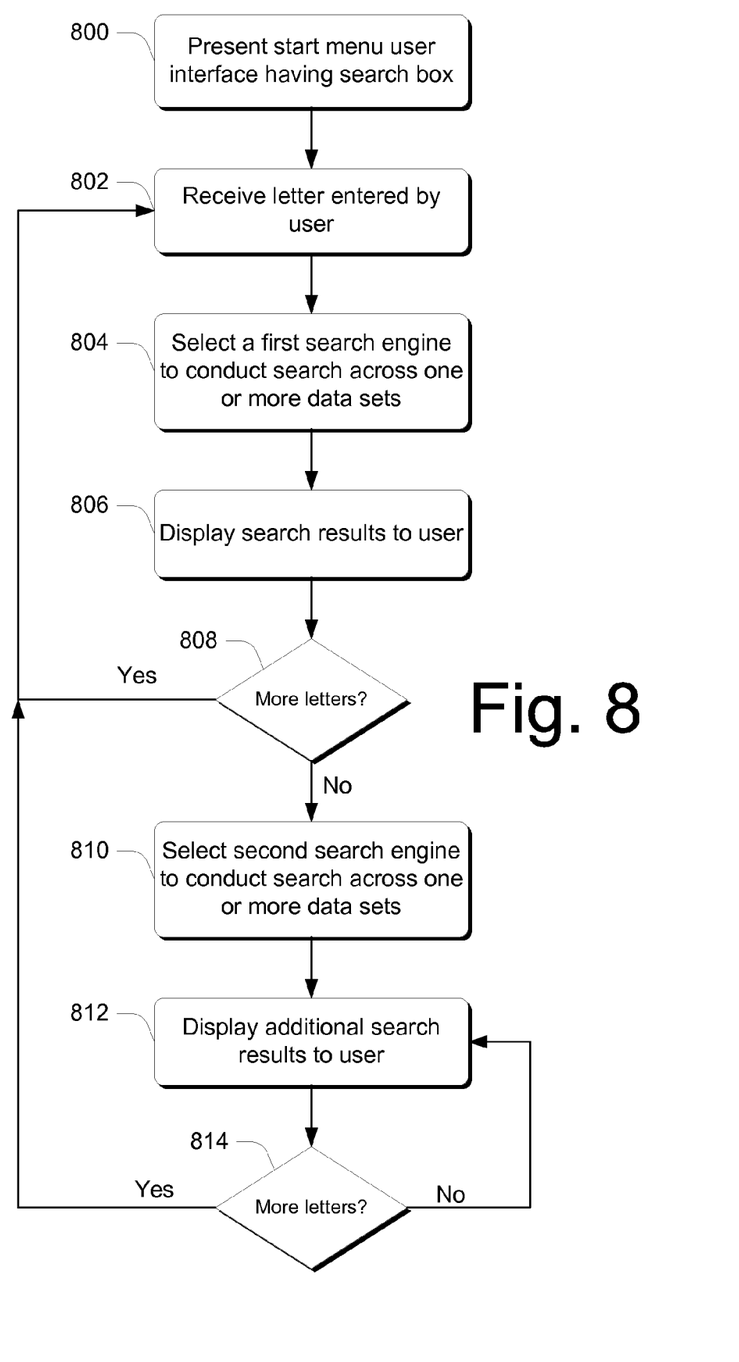
FIG. 8 is a flow diagram that describes steps in a method in accordance with one embodiment.

FIG. 8 is a flow diagram that describes steps in a method in accordance with one embodiment. The method can be implemented in connection with any suitable hardware, software, firmware or combination thereof. In at least one embodiment, the method can be implemented by a suitably configured search tool that comprises part of a start menu.

Step 800 presents a start menu user interface having a search tool that includes a search box. Step 802 receives a letter that is entered by a user. Step 804 selects a first search engine to conduct a search across one or more data sets. Examples of data sets are given above.

Step 806 displays search results, associated with the letter, to the user. But one way of displaying the search results is to display the results in accordance with pre-defined categories or groups that make up subject matter that a user is likely to want to see. But one example of such groups is given above.

Step 808 determines whether the user has typed any additional letters. This step can be implemented by defining a short period of time and then ascertaining whether, during this period of time, the user types any additional letters. If the user types additional letters, then the method returns to step 802 and repeats the process described above. If, on the other hand, the user does not type any additional letters, step 810 selects a second or additional search engine(s) to conduct a search across one or more data sets. The data sets across which the second or additional search engine(s) search can be the same as or different from those searched using the first search engine.

Step 812 displays additional search results to the user. This step can be performed in any suitable way. Step 814 ascertains whether there are any additional letters entered by the user. If so, the method returns to step 802 and continues the search. If not, the method can return to step 812 which simply displays or continues to display the search results developed for the user.

In practice, in at least this embodiment, the first search that is conducted is a fast search, e.g. a linear search on small data set, whose results are returned to the user. If the user does not type additional letters, then a slower search, e.g. an index search on a large data set, is performed. One advantage of this approach is that at least some results are returned to the user very quickly. Additionally, if the user has typed more letters, then time and resources are not wasted performing the slower search on an inappropriate string.

CONCLUSION

Various embodiments provide a search tool that utilizes multiple different search engines. The individual search engines are configured to conduct searches in different ways across a search space that includes different types of data sets. In at least some embodiments, the type of search engine that is utilized is a function of characteristics of the data set(s) that is (are) to be searched. In search spaces that include different types of data sets, combining and mixing different search engines to collectively search the search space can provide a desirably fast and robust user experience.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method for efficient searching of multiple data sets, the method implemented on a computing device by a processor configured to execute instructions that, when executed by the processor, direct the computing device to perform acts comprising:
   receiving a search input directed to a search space;
   selecting a first search engine configured to conduct a first type of search in the search space across programs and web-related items;
   selecting a second search engine configured to conduct a second type of search in the search space across files and communications;
   using the first search engine to conduct a search of the programs and web-related items and the second search engine to conduct a search of the files and communications; and
   causing a display of results of the search conducted by the first search engine and results of the search conducted by the second search engine.

2. The method of claim 1, wherein search input comprises a search input received via a search box provided as part of a start menu user interface.

3. The method of claim 1, wherein the search space comprises one or more computing devices, one or more servers, or one or more networked data repositories.

4. The method of claim 1, wherein the first type of search comprises a linear search that linearly searches a collection of items in the multiple data sets and the second type of search comprises an index search that searches an index which indexes content in the multiple data sets.

5. The method of claim 1, wherein using the first search engine and using the second search engine occurs at the same time.

6. The method of claim 1, wherein causing the display of results comprises causing a display of results in accordance with pre-defined categories such that results of the search sharing a one of the pre-defined categories are grouped together in a display of results of the search.

7. The method of claim 6, wherein the pre-defined categories or groups comprise programs, web-related items, files, and communications.

8. The method of claim 1, wherein causing the display of results comprises causing a display of results on a letter-by-letter basis as individual letters of the search input are received.

9. A computing device, comprising:
   one or more processors; and
   a computer-readable medium comprising computer-readable instructions which, when executed, implement acts comprising
      receiving a search input;
      selecting a first search engine configured to conduct a linear search in a search space across a first one or more data sets;
      selecting a second search engine configured to conduct an index search in the search space across a second one or more data sets different from the first one or more data sets; and
      using the first search engine to conduct a linear search of the first one or more data sets and using the second search engine to conduct an index search of an index which indexes content in the second one or more data sets.

10. The computing device of claim 9, wherein the first one or more data sets comprise programs loaded on a computing device, applications in a path, control panels, web pages in a favorites folder, or web pages from a browsing history.

11. The computing device of claim 9, wherein second one or more data sets comprise document files, music files, other files, email messages, instant messaging messages, appointments, or contacts.

12. The computing device of claim 9, wherein the acts further comprise causing a display of search results deriving from the linear search and the index search.

13. The computing device of claim 12, wherein the causing the display of search results comprises causing a display of search results grouped together in accordance with pre-defined categories comprising programs, web-related items, files, and communications.

14. The computing device of claim 9, wherein the search input comprises search input received via a search box provided as part of a start menu user interface.

15. The computing device of claim 9, wherein the search space comprises one or more computing devices, one or more servers, or one or more networked data repositories.

16. The computing device of claim 9, wherein using the first search engine and using the second search engine occurs at the same time.

17. A computer-implemented method implemented on a computing device by a processor configured to execute instructions that, when executed by the processor, direct the computing device to perform acts comprising:
   receiving a query string entered letter-by-letter as search input;
   responsive to determining that the query string is less than a threshold number of letters, using a first search engine to search programs, web-related items, or both, for the letter or letters of the query string as each letter of the query string is entered;
   responsive to determining that a number of letters in the query string is equal or greater than the threshold number of letters, repeating the using of the first search engine and also using a second search engine to search files, communications, or both for the query string; and
   causing a display of search results on a letter-by-letter basis.

18. The method of claim 17, wherein the first search engine and the second search engine search the query string against a search space containing at least one of programs or web-related items and at least one of files or communications.

19. The method of claim 17, wherein the threshold number of letters is two or three.

20. The method of claim 17, wherein the first search engine is configured to conduct a linear search and the second search engine is configured to conduct an index search.

* * * * *